(12) United States Patent
Chuang

(10) Patent No.: US 10,703,211 B2
(45) Date of Patent: *Jul. 7, 2020

(54) BATTERY PACK, BATTERY CHARGING STATION, AND CHARGING METHOD

(71) Applicant: THUNDER POWER NEW ENERGY VEHICLE DEVELOPMENT COMPANY LIMITED, Central (HK)

(72) Inventor: Chi-Sheng Chuang, New Taipei (TW)

(*) Notice: Subject to any disclaimer, the term of this patent is extended or adjusted under 35 U.S.C. 154(b) by 253 days.

This patent is subject to a terminal disclaimer.

(21) Appl. No.: 14/748,187

(22) Filed: Jun. 23, 2015

(65) Prior Publication Data

US 2016/0272082 A1 Sep. 22, 2016

Related U.S. Application Data

(60) Provisional application No. 62/150,848, filed on Apr. 22, 2015, provisional application No. 62/133,991, filed on Mar. 16, 2015.

(51) Int. Cl.
*H02J 7/00* (2006.01)
*B60L 11/18* (2006.01)
(Continued)

(52) U.S. Cl.
CPC .......... *B60L 11/1864* (2013.01); *B60L 53/60* (2019.02); *B60L 58/12* (2019.02); *B60L 58/15* (2019.02);
(Continued)

(58) Field of Classification Search
CPC .......................... B60L 11/1864; H02J 7/0018
(Continued)

(56) References Cited

U.S. PATENT DOCUMENTS 3,723,215 A 3/1973 Kessler
3,930,192 A 12/1975 Dinkler
(Continued)

FOREIGN PATENT DOCUMENTS

AU 2008200543 A1 8/2009
CN 102118039 A 7/2011
(Continued)

OTHER PUBLICATIONS

U.S. Appl. No. 15/008,416, filed Jan. 27, 2016, Non-Final Office Action dated Jul. 6, 2016, all pages.
(Continued)

*Primary Examiner* — Jerry D Robbins
(74) *Attorney, Agent, or Firm* — Kilpatrick Townsend & Stockton, LLP

(57) ABSTRACT

Various techniques described herein relate to battery packs of electric vehicles, batteries, and battery charging systems. Batteries may comprise a plurality of battery modules, wherein each battery module may be provided with one or more battery cells, and the plurality of battery modules may be connected in series when providing electric power output. Battery charging systems described herein may comprise a charging circuit that connects a plurality of battery modules in series, and may be used for charging the plurality of battery modules in the battery in series. Additional charging circuits may be connected respectively to the plurality of battery modules, and the additional charging circuits may be used for charging at least one battery module in the plurality of battery modules.

14 Claims, 4 Drawing Sheets

(51) Int. Cl.
  *H01M 10/44* (2006.01)
  *B60L 58/21* (2019.01)
  *B60L 58/20* (2019.01)
  *B60L 58/22* (2019.01)
  *B60L 58/15* (2019.01)
  *B60L 53/60* (2019.01)
  *B60L 58/12* (2019.01)

(52) U.S. Cl.
  CPC ............... *B60L 58/20* (2019.02); *B60L 58/21* (2019.02); *B60L 58/22* (2019.02); *H01M 10/441* (2013.01); *H02J 7/0018* (2013.01); *H02J 7/0021* (2013.01); *Y02T 10/7005* (2013.01); *Y02T 10/7044* (2013.01); *Y02T 10/7055* (2013.01); *Y02T 10/7061* (2013.01)

(58) Field of Classification Search
  USPC .................................................. 320/109, 112
  See application file for complete search history.

(56) References Cited

U.S. PATENT DOCUMENTS

| | | | |
|---|---|---|---|
| 4,007,315 A | 2/1977 | Brinkmann et al. | |
| 4,026,468 A | 5/1977 | Tinder et al. | |
| 4,079,275 A | 3/1978 | Fu | |
| 4,248,383 A | 2/1981 | Savage et al. | |
| 4,281,276 A | 7/1981 | Cutler et al. | |
| 4,324,363 A | 4/1982 | Rauen, Jr. | |
| 4,693,652 A | 9/1987 | Sweeney | |
| 4,848,835 A | 7/1989 | DeRees | |
| 4,926,105 A | 5/1990 | Mischenko et al. | |
| 5,115,342 A | 5/1992 | Rowe et al. | |
| 5,121,044 A | 6/1992 | Goldman | |
| 5,289,890 A | 3/1994 | Toyoda et al. | |
| 5,345,155 A | 9/1994 | Masaki et al. | |
| 5,585,204 A | 12/1996 | Oshida et al. | |
| 5,619,784 A | 4/1997 | Nishimoto et al. | |
| 5,666,040 A | 9/1997 | Bourbeau | |
| 5,710,504 A | 1/1998 | Pascual et al. | |
| 5,830,308 A | 11/1998 | Reichard | |
| 5,875,691 A | 3/1999 | Hata et al. | |
| 5,889,342 A | 3/1999 | Hasebe et al. | |
| 5,969,624 A | 10/1999 | Sakai | |
| 6,089,034 A | 7/2000 | Lake et al. | |
| 6,126,219 A | 10/2000 | Wilkinson et al. | |
| 6,272,809 B1 | 8/2001 | Wycech | |
| 6,335,078 B2 | 1/2002 | Venkataramani et al. | |
| 6,347,528 B1 | 2/2002 | Iritani et al. | |
| 6,357,541 B1 | 3/2002 | Matsuda et al. | |
| 6,367,570 B1 | 4/2002 | Long, III et al. | |
| 6,450,275 B1 | 9/2002 | Gabriel et al. | |
| 6,481,230 B2 | 11/2002 | Kimishima et al. | |
| 6,504,344 B1 | 1/2003 | Adams et al. | |
| 6,575,258 B1 | 6/2003 | Clemmer | |
| 6,766,036 B1 | 7/2004 | Pryor | |
| 6,772,504 B2 | 8/2004 | Weidman et al. | |
| 6,899,377 B2 | 5/2005 | Ghuman et al. | |
| 6,933,076 B2 | 8/2005 | Ura et al. | |
| 7,208,854 B1 | 4/2007 | Saban et al. | |
| 7,230,404 B2 | 6/2007 | Kimoto et al. | |
| 7,289,645 B2 | 10/2007 | Yamamoto et al. | |
| 7,325,866 B2 | 2/2008 | Horton et al. | |
| 7,332,242 B2 | 2/2008 | Sato et al. | |
| 7,335,205 B2 | 2/2008 | Aeschlimann et al. | |
| 7,436,139 B2 | 10/2008 | Maslov et al. | |
| 7,451,808 B2 | 11/2008 | Busse et al. | |
| 7,789,176 B2 | 9/2010 | Zhou | |
| 7,834,500 B2 | 11/2010 | Savant | |
| 7,841,431 B2 | 11/2010 | Zhou | |
| 8,020,656 B2 | 9/2011 | Inoue et al. | |
| 8,159,191 B2 | 4/2012 | Chang et al. | |
| 8,191,618 B2 | 6/2012 | Gering et al. | |
| 8,336,319 B2 | 12/2012 | Johnston et al. | |
| 8,344,849 B2 | 1/2013 | Larsson et al. | |
| 8,450,888 B2 | 5/2013 | Shafer et al. | |
| 8,479,855 B2 | 7/2013 | Kim et al. | |
| 8,527,130 B2 | 9/2013 | Kitahata et al. | |
| 8,556,558 B1 | 10/2013 | Hunt | |
| 8,564,246 B2 * | 10/2013 | Wade ................... | H02J 7/0018 320/119 |
| 8,571,738 B1 | 10/2013 | Potter et al. | |
| 8,625,855 B2 | 1/2014 | El Dokor | |
| 8,641,133 B1 | 2/2014 | Scaringe et al. | |
| 8,796,881 B2 | 8/2014 | Davis | |
| 8,798,832 B2 | 8/2014 | Kawahara et al. | |
| 8,818,716 B1 | 8/2014 | El Dokor et al. | |
| 8,892,281 B2 | 11/2014 | Suzuki et al. | |
| 8,896,167 B2 | 11/2014 | McKinzie et al. | |
| 8,955,345 B2 | 2/2015 | Meitinger et al. | |
| 8,983,718 B2 | 3/2015 | Ricci | |
| 8,985,680 B2 | 3/2015 | Mildner | |
| 9,180,753 B2 | 11/2015 | Kim et al. | |
| 9,250,020 B2 | 2/2016 | Vikstrom et al. | |
| 9,469,350 B2 | 10/2016 | Wu | |
| 9,499,067 B2 | 11/2016 | Dai | |
| 9,601,733 B2 | 3/2017 | Sham | |
| 9,610,857 B2 | 4/2017 | Dai | |
| 2002/0005440 A1 | 1/2002 | Holt et al. | |
| 2002/0134857 A1 | 9/2002 | Zimmer | |
| 2002/0182493 A1 | 12/2002 | Ovshinsky et al. | |
| 2003/0155001 A1 | 8/2003 | Hoetzer et al. | |
| 2004/0080218 A1 | 4/2004 | Weidman et al. | |
| 2004/0113589 A1 | 6/2004 | Crisp et al. | |
| 2004/0195833 A1 | 10/2004 | Zoellner | |
| 2005/0206511 A1 | 9/2005 | Heenan et al. | |
| 2006/0021811 A1 | 2/2006 | Kuang et al. | |
| 2006/0132101 A1 | 6/2006 | Ambrosio et al. | |
| 2006/0175995 A1 | 8/2006 | Shinmura et al. | |
| 2006/0211364 A1 | 9/2006 | Brotz et al. | |
| 2007/0009787 A1 | 1/2007 | Straubel et al. | |
| 2007/0077541 A1 | 4/2007 | Champagne et al. | |
| 2007/0084484 A1 | 4/2007 | Porter et al. | |
| 2007/0261787 A1 | 11/2007 | Malis | |
| 2007/0278325 A1 | 12/2007 | Sato et al. | |
| 2008/0024020 A1 | 1/2008 | Iund et al. | |
| 2008/0042493 A1 | 2/2008 | Jacobs | |
| 2008/0067965 A1 | 3/2008 | Bailey et al. | |
| 2008/0116379 A1 | 5/2008 | Teder | |
| 2008/0210780 A1 | 9/2008 | Discher et al. | |
| 2009/0023056 A1 | 1/2009 | Adams et al. | |
| 2009/0139781 A1 | 6/2009 | Straubel et al. | |
| 2009/0146610 A1 * | 6/2009 | Trigiani ................ | H02J 7/0018 320/119 |
| 2009/0153087 A1 | 6/2009 | Lim et al. | |
| 2009/0206689 A1 | 8/2009 | Harada et al. | |
| 2009/0230921 A1 | 9/2009 | Hsu et al. | |
| 2009/0250533 A1 | 10/2009 | Akiyama et al. | |
| 2009/0278915 A1 | 11/2009 | Kramer et al. | |
| 2010/0152936 A1 | 6/2010 | Wang et al. | |
| 2010/0230991 A1 | 9/2010 | Fioravanti | |
| 2010/0274480 A1 | 10/2010 | McCall et al. | |
| 2011/0001456 A1 | 1/2011 | Wang | |
| 2011/0031921 A1 | 2/2011 | Han | |
| 2011/0073142 A1 | 3/2011 | Hattori et al. | |
| 2011/0128543 A1 | 6/2011 | Choi | |
| 2011/0128555 A1 | 6/2011 | Rotschild et al. | |
| 2011/0159340 A1 | 6/2011 | Hu et al. | |
| 2011/0229749 A1 | 9/2011 | Kim et al. | |
| 2011/0241623 A1 | 10/2011 | Wade et al. | |
| 2011/0246005 A1 | 10/2011 | King et al. | |
| 2011/0266375 A1 | 11/2011 | Ono et al. | |
| 2011/0292212 A1 | 12/2011 | Tanabe et al. | |
| 2011/0309796 A1 * | 12/2011 | Firehammer ......... | H02J 7/0018 320/118 |
| 2012/0070701 A1 | 3/2012 | Gaben | |
| 2012/0091964 A1 | 4/2012 | Vance et al. | |
| 2012/0101690 A1 | 4/2012 | Srinivasan et al. | |
| 2012/0105001 A1 | 5/2012 | Gallegos et al. | |
| 2012/0116699 A1 | 5/2012 | Haag et al. | |
| 2012/0163657 A1 | 6/2012 | Shellshear | |
| 2012/0168125 A1 | 7/2012 | Johnston et al. | |
| 2012/0222833 A1 | 9/2012 | Vikstrom et al. | |
| 2012/0231316 A1 | 9/2012 | Sohn | |

(56) References Cited

U.S. PATENT DOCUMENTS

| | | |
|---|---|---|
| 2012/0266922 A1 | 10/2012 | Krahn et al. |
| 2012/0291987 A1 | 11/2012 | Himmer et al. |
| 2012/0297809 A1 | 11/2012 | Carpenter |
| 2012/0303397 A1 | 11/2012 | Prosser |
| 2012/0313562 A1* | 12/2012 | Murao .............. B60L 3/0046 318/139 |
| 2013/0038151 A1 | 2/2013 | Ohashi et al. |
| 2013/0057117 A1 | 3/2013 | Suzuki et al. |
| 2013/0061630 A1 | 3/2013 | Schaefer et al. |
| 2013/0092758 A1 | 4/2013 | Tanaka et al. |
| 2013/0094086 A1 | 4/2013 | Bochenek |
| 2013/0117963 A1 | 5/2013 | Liu |
| 2013/0124038 A1 | 5/2013 | Naboulsi |
| 2013/0136975 A1 | 5/2013 | Uchida |
| 2013/0144470 A1 | 6/2013 | Ricci |
| 2013/0153338 A1 | 6/2013 | Yamauchi |
| 2013/0179061 A1 | 7/2013 | Gadh et al. |
| 2013/0217409 A1 | 8/2013 | Bridges et al. |
| 2013/0221926 A1* | 8/2013 | Furtner .............. G06F 1/263 320/129 |
| 2013/0235381 A1 | 9/2013 | Kroekel et al. |
| 2013/0249317 A1 | 9/2013 | Kang et al. |
| 2014/0009615 A1 | 1/2014 | Kiyohara et al. |
| 2014/0017528 A1 | 1/2014 | Yuji et al. |
| 2014/0021924 A1 | 1/2014 | Abe et al. |
| 2014/0033865 A1 | 2/2014 | Suzuki et al. |
| 2014/0067323 A1 | 3/2014 | Skelton |
| 2014/0070013 A1 | 3/2014 | Stanek et al. |
| 2014/0077631 A1 | 3/2014 | Watanabe et al. |
| 2014/0081521 A1 | 3/2014 | Frojdh et al. |
| 2014/0089864 A1 | 3/2014 | Cheng et al. |
| 2014/0090673 A1 | 4/2014 | Atsumi et al. |
| 2014/0121927 A1 | 5/2014 | Hanita |
| 2014/0124159 A1 | 5/2014 | Kim |
| 2014/0141300 A1 | 5/2014 | Ronning et al. |
| 2014/0145933 A1 | 5/2014 | Chae et al. |
| 2014/0167655 A1 | 6/2014 | Chatroux et al. |
| 2014/0203782 A1* | 7/2014 | Xue .............. H02J 7/007 320/134 |
| 2014/0216709 A1 | 8/2014 | Smith et al. |
| 2014/0223384 A1 | 8/2014 | Graumann |
| 2014/0247135 A1 | 9/2014 | Proud |
| 2014/0277936 A1 | 9/2014 | El Dokor et al. |
| 2014/0282271 A1 | 9/2014 | Lu et al. |
| 2014/0306826 A1 | 10/2014 | Ricci |
| 2014/0309849 A1 | 10/2014 | Ricci |
| 2014/0311704 A1 | 10/2014 | Yokoyama et al. |
| 2014/0333161 A1 | 11/2014 | Knoblauch |
| 2014/0354291 A1 | 12/2014 | Kikuchi et al. |
| 2014/0356652 A1 | 12/2014 | Boddakayala et al. |
| 2014/0365792 A1 | 12/2014 | Yun |
| 2015/0008931 A1 | 1/2015 | Sugeno et al. |
| 2015/0017642 A1 | 1/2015 | Pahl et al. |
| 2015/0022664 A1 | 1/2015 | Pflug et al. |
| 2015/0025917 A1 | 1/2015 | Stempora |
| 2015/0044522 A1 | 2/2015 | Camp et al. |
| 2015/0054933 A1 | 2/2015 | Wasiek et al. |
| 2015/0069974 A1 | 3/2015 | Okada et al. |
| 2015/0081135 A1 | 3/2015 | Gompert et al. |
| 2015/0088397 A1 | 3/2015 | Burton |
| 2015/0091698 A1 | 4/2015 | Du |
| 2015/0138357 A1 | 5/2015 | Romack et al. |
| 2015/0141043 A1 | 5/2015 | Abramson |
| 2015/0151722 A1 | 6/2015 | Gokan et al. |
| 2015/0168174 A1 | 6/2015 | Abramson |
| 2015/0171642 A1 | 6/2015 | Kato et al. |
| 2015/0188334 A1 | 7/2015 | Dao et al. |
| 2015/0203077 A1 | 7/2015 | Gokan |
| 2015/0317527 A1 | 11/2015 | Graumann et al. |
| 2015/0367859 A1 | 12/2015 | Roth et al. |
| 2016/0001330 A1 | 1/2016 | Romack et al. |
| 2016/0048725 A1 | 2/2016 | Holz et al. |
| 2016/0056510 A1 | 2/2016 | Takeuchi et al. |
| 2016/0086391 A1 | 3/2016 | Ricci |
| 2016/0271905 A1 | 9/2016 | Lo |
| 2016/0271926 A1 | 9/2016 | Lo |
| 2016/0272036 A1 | 9/2016 | Chen et al. |
| 2016/0272039 A1 | 9/2016 | Cheng |
| 2016/0272040 A1 | 9/2016 | Cheng |
| 2016/0272043 A1 | 9/2016 | Cheng |
| 2016/0272044 A1 | 9/2016 | Cheng |
| 2016/0272045 A1 | 9/2016 | Chen et al. |
| 2016/0272083 A1 | 9/2016 | Dai |
| 2016/0272084 A1 | 9/2016 | Chuang |
| 2016/0272085 A1 | 9/2016 | Dai |
| 2016/0272087 A1 | 9/2016 | Lai |
| 2016/0272164 A1 | 9/2016 | Hsiao et al. |
| 2016/0272165 A1 | 9/2016 | Hsiao et al. |
| 2016/0272242 A1 | 9/2016 | Sham |
| 2016/0272254 A1 | 9/2016 | Wu |
| 2016/0274668 A1 | 9/2016 | Hsaio et al. |
| 2016/0274669 A1 | 9/2016 | Hsiao et al. |
| 2016/0276638 A1 | 9/2016 | Sham |
| 2016/0276721 A1 | 9/2016 | Ho |
| 2016/0276722 A1 | 9/2016 | Ho |
| 2016/0276854 A1 | 9/2016 | Lai |
| 2016/0276855 A1 | 9/2016 | Lian |
| 2016/0276903 A1 | 9/2016 | Lai |
| 2016/0276905 A1 | 9/2016 | Lai |
| 2016/0276963 A1 | 9/2016 | Lai |
| 2016/0325638 A1 | 11/2016 | Dai |
| 2016/0339797 A1 | 11/2016 | Dai |
| 2017/0158059 A1 | 6/2017 | Dai |

FOREIGN PATENT DOCUMENTS

| | | |
|---|---|---|
| CN | 102118041 A | 7/2011 |
| CN | 102709981 A | 10/2012 |
| CN | 205657447 U | 10/2016 |
| DE | 3837701 A1 | 5/1990 |
| EP | 1 386 828 A2 | 2/2004 |
| EP | 2 565 959 A2 | 6/2013 |
| EP | 2 670 018 A1 | 12/2013 |
| EP | 2725684 A1 | 4/2014 |
| EP | 2949520 A1 | 12/2015 |
| JP | 3331529 B2 | 10/1994 |
| JP | 2007253640 A | 10/2007 |
| JP | 2009294338 A | 12/2009 |
| JP | 2010057316 A1 | 3/2010 |
| JP | 2010273417 A | 12/2010 |
| JP | 2012 192543 A | 10/2012 |
| JP | 2013162597 A1 | 8/2013 |
| JP | 2014223867 A | 12/2014 |
| KR | 2011/C89604 A | 3/2011 |
| WO | 2006/124663 A2 | 11/2006 |
| WO | 2011/067646 A1 | 6/2011 |
| WO | 2011/126909 A2 | 10/2011 |
| WO | 2012/105448 A1 | 9/2012 |
| WO | 2013/015162 A1 | 1/2013 |
| WO | 2014103008 A1 | 7/2014 |
| WO | 2015103008 A1 | 7/2014 |
| WO | 2015/035406 A1 | 3/2015 |

OTHER PUBLICATIONS

U.S. Appl. No. 15/006,126, filed Jan. 26, 2016, Non-Final Office Action dated Jul. 25, 2016, all pages.

U.S. Appl. No. 14/981,772, filed Dec. 28, 2015, Notice of Allowance dated Jul. 28, 2016, all pages.

U.S. Appl. No. 14/981,772, filed Dec. 28, 2015, Non-Final Office Action dated May 26, 2016, all pages.

U.S. Appl. No. 14/967,374, filed Dec. 14, 2015, Non-Final Office Action dated Jul. 13, 2016, all pages.

U.S. Appl. No. 14/967,373, filed Dec. 14, 2015, Final Office Action dated Sep. 2, 2016, all pages.

U.S. Appl. No. 14/967,373, filed Dec. 14, 2015, Non-Final Office Action dated Apr. 29, 2016, all pages.

U.S. Appl. No. 14/967,372, filed Dec. 14, 2015, Non-Final Office Action dated Jul. 15, 2016, all pages.

U.S. Appl. No. 14/967,371, filed Dec. 14, 2015, Notice of Allowance dated Aug. 29, 2016, all pages.

(56) References Cited

OTHER PUBLICATIONS

U.S. Appl. No. 14/967,371, filed Dec. 14, 2015, Non-Final Office Action dated May 3, 2016, all pages.
U.S. Appl. No. 14/967,370, filed Dec. 14, 2015, Notice of Allowance dated Aug. 30, 2016, all pages.
U.S. Appl. No. 14/967,370, filed Dec. 14, 2015, Non-Final Office Action dated Apr. 29, 2016, all pages.
U.S. Appl. No. 14/967,368, filed Dec. 14, 2015, Non-Final Office Action dated Apr. 22, 2016, all pages.
U.S. Appl. No. 14/967,366, filed Dec. 14, 2015, Final Office Action dated Aug. 31, 2016, all pages.
U.S. Appl. No. 14/967,366, filed Dec. 14, 2015, Non-Final Office Action dated Apr. 7, 2016, all pages.
U.S. Appl. No. 14/967,364, filed Dec. 14, 2015, Final Office Action dated Aug. 2, 2016, all pages.
U.S. Appl. No. 14/967,364, filed Dec. 14, 2015, Non-Final Office Action dated Mar. 7, 2016, all pages.
U.S. Appl. No. 14/967,359, filed Dec. 14, 2015, Non-Final Office Action dated Apr. 1, 2016, all pages.
U.S. Appl. No. 14/967,357, filed Dec. 14, 2015, Final Office Action dated Sep. 29, 2016, all pages.
U.S. Appl. No. 14/967,357, filed Dec. 14, 2015, Non-Final Office Action dated Jun. 3, 2016, all pages.
U.S. Appl. No. 14/967,356, filed Dec. 14, 2015, Final Office Action dated Aug. 3, 2016, all pages.
U.S. Appl. No. 14/967,356, filed Dec. 14, 2015, Non-Final Office Action dated Apr. 15, 2016, all pages.
U.S. Appl. No. 14/883,621, filed Oct. 15, 2015, Notice of Allowance dated Sep. 14, 2016, all pages.
U.S. Appl. No. 14/883,621, filed Oct. 15, 2015, Non-Final Office Action dated Apr. 25, 2016, all pages.
U.S. Appl. No. 14/883,605, filed Oct. 14, 2015, Notice of Allowance dated Aug. 31, 2016, all pages.
U.S. Appl. No. 14/883,605, filed Oct. 14, 2015, Non-Final Office Action dated Apr. 14, 2016, all pages.
U.S. Appl. No. 14/883,599, filed Oct. 14, 2015, Non-Final Office Action dated Apr. 5, 2016, all pages.
U.S. Appl. No. 14/842,803, filed Sep. 1, 2015, Notice of Allowance dated Sep. 12, 2016, all pages.
U.S. Appl. No. 14/842,803, filed Sep. 1, 2015, Non-Final Office Action dated Apr. 29, 2016, all pages.
U.S. Appl. No. 14/821,789, filed Aug. 10, 2015, Non-Final Office Action dated Oct. 17, 2016, all pages.
U.S. Appl. No. 14/816,065, filed Aug. 3, 2015, Notice of Allowance dated Aug. 26, 2016, all pages.
U.S. Appl. No. 14/816,065, filed Aug. 3, 2015, Non-Final Office Action dated May 3, 2016, all pages.
U.S. Appl. No. 14/816,064, filed Aug. 3, 2015, Notice of Allowance dated Aug. 31, 2016, all pages.
U.S. Appl. No. 14/816,064, filed Aug. 3, 2015, Non-Final Office Action dated Apr. 29, 2016, all pages.
U.S. Appl. No. 14/748,210, filed Jun. 23, 2015, Notice of Allowance dated Jun. 3, 2016, all pages.
Shema Ann Mathew et al: "A smart wireless battery monitoring system for Electric Vehicles" Intelligent Systems Design and Applications (ISDA), 2012 12$^{TH}$ International Conference on, IEEE, Nov. 27, 2012 (Nov. 27, 2012), pp. 189-193.
Matthias Schneider et al: "Automotive battery monitoring by wireless cell sensors", 2013 IEEE International Instrumentation and Measurement Technology Conference (I2MTC) IEEE, May 13, 2012 (May 13, 2012), pp. 816-820.
Damian Alonso et al: "Towards a Wireless Battery Management System: Evaluation of Antennas and Radio Channel Measurements Inside a Battery Emulator", 2014 IEEE 80th Vehicular Technology Conference (VTC2014—Fall), Sep. 2014 (Sep. 2014), pp. 1-5.
Roscher Valentin et al: "Synchronisation using wireless trigger-broadcast for impedance spectroscopy of battery cells" 2015 IEEE Sensors Applications Symposium (SAS), IEEE; Apr. 13, 2015 (Apr. 13, 2015), pp. 1-6.
European Search Report dated Aug. 30, 2016 in European Patent Application No. 16160450.9, all pages.
European Search Report for EP 16160467 dated Jul. 22, 2016, all pages.
European Search Report for EP 16160441 dated Jul. 7, 2016, all pages.
European Search Report for EP 16160486 dated Jul. 6, 2016, all pages.
Specification for U.S. Appl. No. 62/133,991, filed Mar. 16, 2015, Inventor: Lai, et al., all pages.
Specification for U.S. Appl. No. 62/150,848, filed Apr. 22, 2015, Inventor: Lai, et al., all pages.
U.S. Appl. No. 14/967,359, filed Dec. 14, 2015, Final Rejection dated Nov. 7, 2016, all pages.
U.S. Appl. No. 14/967,360, filed Dec. 14, 2015, Non-Final Rejection dated Dec. 1, 2016, all pages.
U.S. Appl. No. 14/967,364, filed Dec. 14, 2015, Notice of Allowance dated Nov. 22, 2016, all pages.
U.S. Appl. No. 15/006,126, filed Jan. 26, 2016, Non-Final Rejection dated Jul. 25, 2016, all pages.
U.S. Appl. No. 15/006,126, filed Jan. 26, 2016, Notice of Allowance dated Nov. 7, 2016, all pages.
Extended European Search Report dated Jul. 28, 2016, for European Patent Application No. 16160393.1, 9 pages.
Final Office Action dated Aug. 3, 2016, for U.S. Appl. No. 14/967,360, 21 pages.
Non-Final Office Action dated Apr. 4, 2016, for U.S. Appl. No. 14/967,360, 14 pages.
Non-Final Office Action dated Aug. 8, 2016, for U.S. Appl. No. 15/063,435, 9 pages.
U.S. Appl. No. 14/883,599, filed Oct. 14, 2015, Non-Final Rejection dated Mar. 24, 2017, all pages.
Office Action for European Application No. 16 160 393.1 dated Aug. 4, 2017, 6 pages.
First Office Action with Search Report for CN Appln. No. 201610146881 dated Nov. 6, 2017, 10 pages.
U.S. Appl. No. 15/215,254, filed Jul. 20, 2016, Non-Final Rejection dated Sep. 18, 2017, all pages.
U.S. Appl. No. 15/230,293, filed Aug. 5, 2016, Notice of Allowance dated Oct. 3, 2017, all pages.
U.S. Appl. No. 14/883,599, filed Oct. 14, 2015, Final Rejection dated Oct. 5, 2017, all pages.
U.S. Appl. No. 14/967,360, filed Dec. 14, 2015, Notice of Allowance dated Jun. 19, 2017, all pages.

* cited by examiner

BATTERY PACK, BATTERY CHARGING STATION, AND CHARGING METHOD

CROSS-REFERENCE TO RELATED APPLICATIONS

The present application is a non-provisional of and claims priority to U.S. Provisional Patent Application No. 62/133,991, filed Mar. 16, 2015, and entitled "IMPROVEMENTS TO ELECTRIC VEHICLES." The present application is also a non-provisional of and claims priority to U.S. Provisional Patent Application No. 62/150,848, filed Apr. 22, 2015, and entitled "IMPROVEMENTS TO ELECTRIC VEHICLES." The entire contents of each of the 62/133,991 and 62/150,848 provisional applications are incorporated herein by reference for all purposes.

FIELD OF THE INVENTION

The present invention relates to charging technologies of electric batteries, for example, electric vehicle batteries. Particularly, the present invention relates to charging groups of battery modules in series and also charging individual battery modules in the group.

BACKGROUND OF THE INVENTION

Battery charging technologies are an important part of the development of new electric battery-powered devices, such as electric vehicles. For example, environment-friendly and energy-saving new energy electric vehicles are an emerging field of automobile development. Batteries within electric vehicles or other electric devices may be composed of a plurality of battery modules connected in series. For example, if a battery includes 10 battery modules in total, each battery module providing 40V voltage output, then a 400V voltage output may be obtained when all the battery modules are connected in series. In some charging systems, such battery modules may be connected in series to charge all of the modules together. However, in some such cases, battery modules charged in series may charge unbalancedly and certain individual battery modules might not fully charge, for example, due to differences in resistance and the like among the individual battery modules.

BRIEF SUMMARY OF THE INVENTION

The present invention is intended to solve these and other above problems relating to charging battery modules within a battery of an electric device.

One object of the present invention is to provide battery packs for an electric vehicles and other electric devices, comprising a battery and a battery charging system, wherein the battery comprises a plurality of battery modules, each battery module is includes (or is provided with) one or more battery cells, and the plurality of battery modules are connected in series when providing electric power output, wherein the battery charging system comprises: a first charging circuit, the first charging circuit connects the plurality of battery modules in series, and the first charging circuit is used for charging the plurality of battery modules in the battery in series; second charging circuits, the second charging circuits are connected to the plurality of battery modules respectively, and the second charging circuits are used for charging at least one battery module in the plurality of battery modules.

Another object of the present invention is to provide battery charging stations, used for charging a battery, wherein the battery comprises a plurality of battery modules, each battery module includes one or more battery cells, and the plurality of battery modules are connected in series when providing electric power output, wherein the battery charging station comprises: a first charging circuit for charging the battery in series; second charging circuits for charging at least one battery module; the first charging circuit and the second charging circuits can work cooperatively with each other, or the first charging circuit and the second charging circuits work independently.

Yet another object of the present invention is to provide methods for charging batteries, wherein the battery comprises a plurality of battery modules, each battery module includes one or more battery cells, and the plurality of battery modules are connected in series when providing electric power output, wherein the method comprises the following steps: 1) measuring the voltage of the battery, judging whether the battery needs to be charged, if so, then: 2) using a first charging circuit to charge the battery modules in the battery in series; 3) measuring whether the voltage of the battery modules connected in series reaches a first preset voltage value; 4) if the voltage of the battery modules connected in series reaches the first preset voltage value, measuring whether the voltage of each battery module in the battery reaches a second preset voltage value; 5) selecting one or more battery modules not reaching the second preset voltage value; and 6) using the corresponding second charging circuits to charge the selected one or more battery modules until the voltages thereof reach the second preset voltage value.

In some embodiments of the battery packs, battery charging stations, and charging methods described herein, at least two sets of independent and/or cooperative charging circuits are used for charging the battery modules of the battery. For example, a first charging circuit may charge the entire battery at the same time in series, while a plurality of second charging circuits may independently charge individual battery modules in the battery according to their voltage states, in order to solve the problem of unbalance when charging in series.

DETAILED DESCRIPTION

Figure 1:
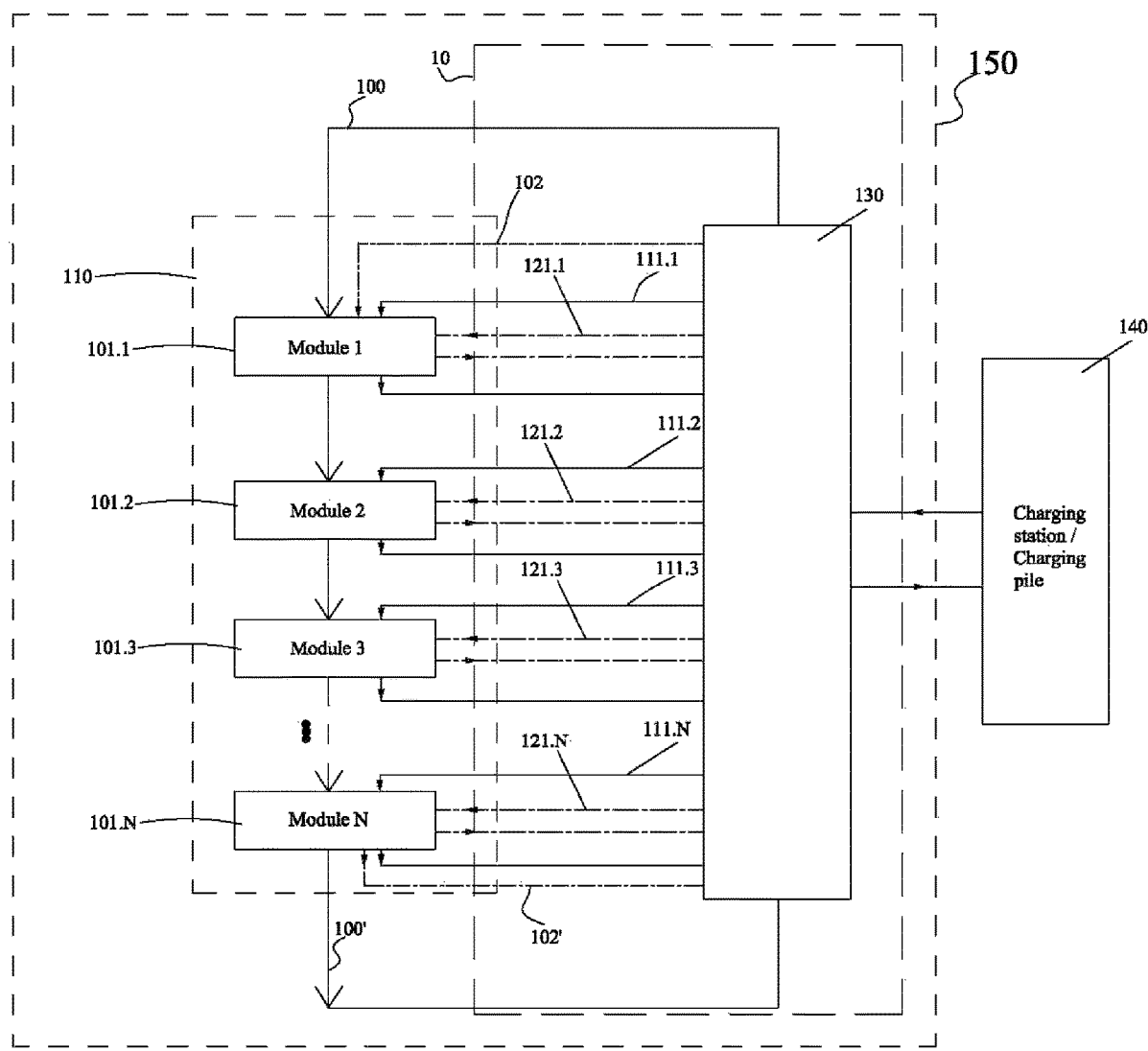
FIG. 1 schematic diagram of a circuit structure of a battery charging system in accordance with one or more embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Various embodiments of the present invention will be described below with reference to the drawings constituting a part of the description. It should be understood that, although terms representing directions are used in the present invention, such as "front", "rear", "upper", "lower", "left", "right", and the like, for describing various exemplary structural parts and elements of the present invention, these terms are used herein only for the purpose of convenience of explanation and are determined based on the exemplary orientations shown in the drawings. Since the embodiments disclosed by the present invention can be arranged according to different directions, these terms representing directions are merely used for illustration and should not be regarded as limitation. Wherever possible, the same or similar reference marks used in the present invention refer to the same components.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium. A processor(s) may perform the necessary tasks.

Various techniques (e.g., systems, circuits, methods, non-transitory computer-readable storage memory storing a plurality of instructions executable by one or more processors, etc.) are described herein relating to battery packs of electric vehicles, batteries and battery charging systems. Batteries described herein may comprise a plurality of battery modules, wherein each battery module may include one or more battery cells, and the plurality of battery modules may be connected in series when providing electric power output. Battery charging systems described herein may comprise a charging circuit that connects a plurality of battery modules in series, and may be used for charging the plurality of battery modules in the battery in series. Additional charging circuits may be connected respectively to the plurality of battery modules, and the additional charging circuits may be used for charging at least one battery module in the plurality of battery modules.

Referring now to FIG. 1, a schematic diagram is shown of a circuit structure of a battery charging system in accordance with certain embodiments.

As shown in FIG. 1, a battery pack 150 may include a battery charging system 10 and a battery 110. The battery 110 may include a plurality of battery modules 101.1, 101.2, 101.3, . . . , 101.*i*, . . . , 101.N (which may be referred to individually or collectively as battery module(s) 101), and each battery module 101.1, 101.2, 101.3, . . . , 101.*i*, . . . , 101.N may be comprised of (or may include) one or more battery cells. The battery modules 101.1, 101.2, 101.3, . . . , 101.*i*, . . . 101.N may be connected in series to form the battery 110 which may supply power to any electrical device, for example, a motor of an electric vehicle. The charging system 10 in this example also includes a first charging circuit 100, 100', one or more second charging circuits 111.1, 111.2, 111.3, . . . , 111.*i*, . . . , 111.N (which may be referred to individually or collectively as second charging circuit(s) 111), and a control circuit 130.

In this example, the first charging circuit 100, 100' may be connected to the two ends of the battery 110, and may be used for connecting the plurality of battery modules 101.1, 101.2, . . . , 101.*i*, . . . , 101.N in the battery 110 in series. Each of the battery modules 101.1, 101.2, 101.3, . . . , 101.*i*, . . . 101.N is also individually connected to one of second charging circuits 111.1, 111.2, 111.3, . . . , 111.*i*, . . . 111.N, so that the second charging circuits 111.1, 111.2, 111.3, . . . , 111.*i*, . . . , 111.N may be used to independently charge one or more of the corresponding battery modules 101.*i*. In some embodiments, one or more of the second charging circuits may be connected not just to a single battery module, but to multiple battery modules in series. For instance, a second charging circuit 111 may be connected in series to two battery modules, or three battery modules, etc., or any other subset of the plurality of battery modules 101, thereby allowing the second charging circuit 111 to charge only that subset of the plurality of battery modules 101.

The battery charging system 10 may further include a battery voltage feedback circuit 102, 102' and battery module voltage feedback circuits 121.1, 121.2, 121.3, ..., 121.i, ..., 121.N (which may be referred to individually or collectively as battery module voltage feedback circuit(s) 121). The battery voltage feedback circuit 102, 102' in this example connects the two ends of the battery 110 with a battery detecting system (EMS) 210 (see FIG. 2) in the control circuit 130. The battery voltage feedback circuit 102, 102' may detect the voltage state of the battery 110 and may send a voltage signal reflecting the current voltage V of the battery 110 to the control circuit 130. Each battery module voltage feedback circuit 121.i may be connected to the two ends of a corresponding battery module 101.i for detecting the voltage state of each battery module 101.i and sending a voltage signal to the battery detecting system (EMS) 210 of the control circuit 130. Thus, in some embodiments, the voltage state of the entire battery 110, as well as the individual voltage states of each battery module 101.i may be monitored.

In addition, during charging, the control circuit 130 of the battery charging system 10 may be connected with an external charging pile/charging station 140 through, for example, a plug (omitted from the figure). The control circuit 130 may distribute the electric power of the charging pile/charging station 140 to the first charging circuit 100, 100' and the second charging circuits 111.1, 111.2, 111.3, ..., 111.i, ..., 111.N as necessary for charging.

Figure 2:
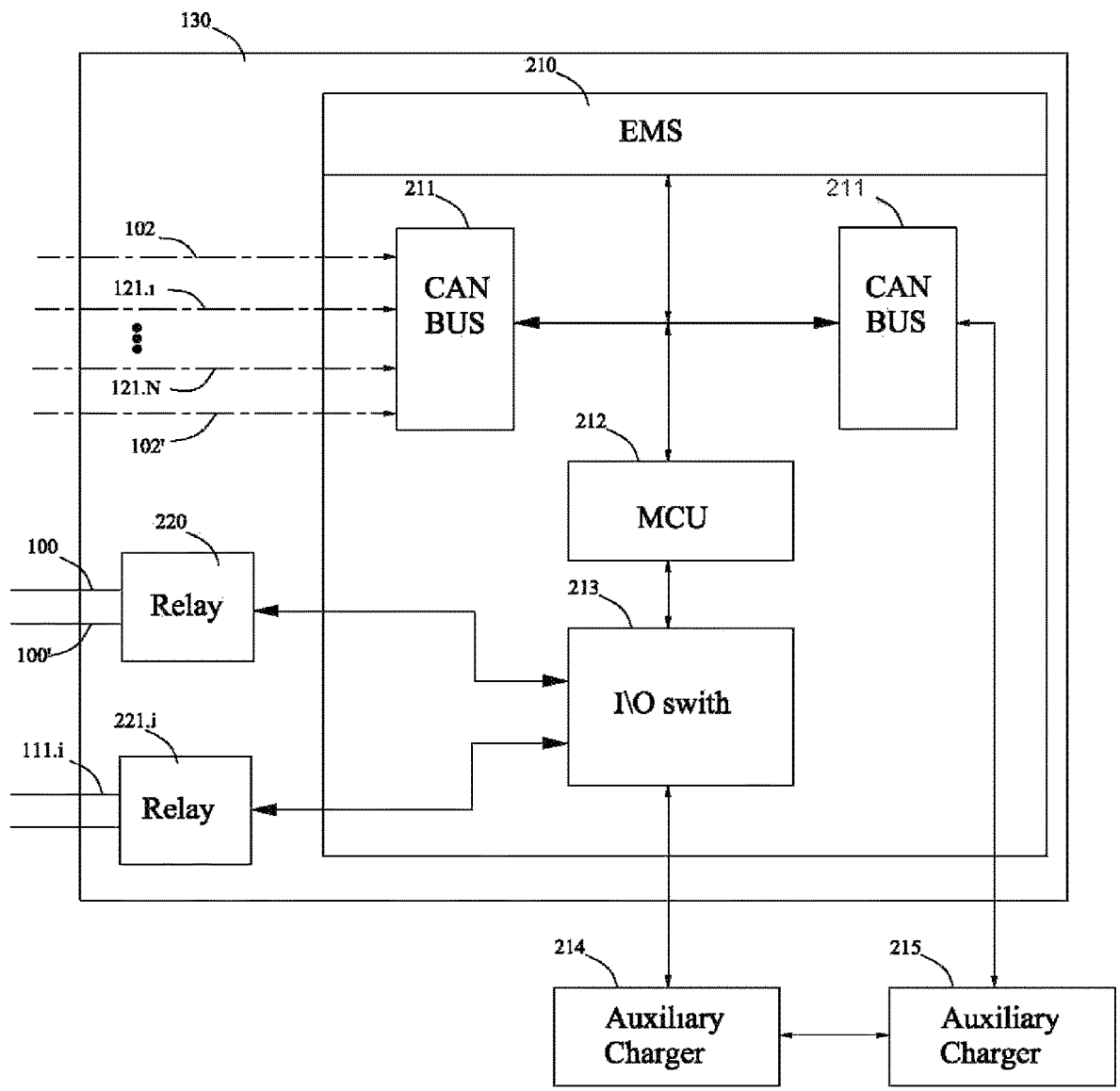
FIG. 2 is a schematic diagram of a circuit structure of a control circuit in accordance with one or more embodiments of the present invention.

Referring now to FIG. 2, another schematic diagram is shown of a circuit structure of a control circuit in accordance with certain embodiments.

As shown in FIG. 2, the control circuit 130 may include a battery detecting system (EMS) 210, a processing chip (MCU) 212, one or more serial communication buses (e.g., controller area network (CAN) buses) 211, an input and output port (I/O switch) 213, and relays 220, 221.i, etc. The serial communication buses 211 may be responsible for the data communication between the modules in the control circuit 130 and between the modules and the outside. The battery detecting system 210 may be integrated within the control circuit 130, and may receive detected voltage signals of the battery voltage feedback circuit 102, 102' as well as battery module voltage feedback circuits 121.1, 121.2, 121.3, ..., 121.i, ..., 121.N through the serial communication bus 211. The battery detecting system 210 may communicate the voltage signals received from the battery voltage feedback circuit 102 and the battery module voltage feedback circuits 121 to the processing chip 212. The processing chip 212 may be responsible for performing (e.g., via hardware circuitry and/or computer-readable media storing computer-executable software instructions to perform the functions) the data calculations and processing of the control circuit 130, and communicating with the battery detecting system (EMS) 210, the input and output port 213, and other components through the serial communication bus 211. The input and output port 213 may be connected with the processing chip 212 and may be responsible for sending the control signal of the processing chip 212 to the relays 220, 221.i to control the working states of the relays 220, 221.i. For example, after processing the voltage signals received from the battery voltage feedback circuit 102 and the battery module voltage feedback circuits 121, the processing chip 212 may determine that the first charging circuit 100 and/or one or more of the second charging circuits 111 should be switched on or switched off. In such cases, the processing chip 212 may send the appropriate control singles to the relay 220 to switch on or off the first charging circuit 100, 100', and to the appropriate relays 221 (e.g., any one or more of the relays 220, 221.1, 221.2, 221.3, ..., 221.i, ..., 221.N respectively connected to the second charging circuits 111.1, 111.2, 111.3, ..., 111.i, ..., 111.N) to switch on or off the corresponding second charging circuits. Each relay 221.i may separately and individually control the switching on and switching off its corresponding second charging circuit 111.i, in response to the control signal received from the processing chip 212 via the input and output port 213.

In addition, the control circuit 130 in this example is further connected with external auxiliary chargers 214, 215 to obtain working electric power. Specifically, the control circuit 130 may be connected with the auxiliary charger 215 through the serial communication bus 211 to obtain a working power supply. The relays 220, 221.i may be connected with the auxiliary charger 214 through the input and output port 213 to obtain the working electric power.

In some embodiments, the control switches of the first charging circuit 100, 100' and the second charging circuits 111.1, 111.2, 111.3, ..., 111.i, ..., 111.N may correspond to the relays 220, 221.i, which may be used as a circuit switches to control the switch-on/switch-off of the control circuit. The control switch also may be a triode and/or other electric elements for controlling the on/off of the circuit. In certain embodiments, the processing chip (MCU) 212 may be, for example, an AT89S51 micro control chip or the like. In these and other embodiments, the processing chip 212 may perform the various functions described herein via hardware circuitry and/or via computer-readable media storing computer-executable software instructions to perform the described functions.

The battery voltage feedback circuit 102, 102' may monitor the voltage V at the two ends of the battery 110 in real time, and may send the voltage signal to the battery detecting system (EMS) 210. The battery detecting system (EMS) 210 may determine whether the battery 110 needs to be charged based on the received voltage signal. If the battery needs to be charged, the processing chip 212 may send a switch-on signal to the relay 220 through the input and output port 213, and the relay 220 may switch on the first charging circuit 100, 100' to charge the battery modules 101.1, 101.2, ... 101.i ... 101.N in series by applying a first charging voltage V1. When the battery detecting system (EMS) 210 determines, based on periodic or continuous voltage monitoring, that the voltage V at the two ends of the battery reaches a first preset voltage value $V^0_1$ (e.g., a voltage at which the battery 110 is regarded as fully charged) through the battery voltage feedback circuit 102, 102', the processing chip 212 may send a switch-off signal to the relay 220 in order to switch off the first charging circuit 100, 100'. In some cases, a high voltage (the first charging voltage V1) may be used for charging the battery 110, so that the charging efficiency may be higher. However, as discussed above, due to individual differences in the battery modules 101.1, 101.2, ..., 101.i, ..., 101.N (e.g., difference in internal resistance, etc.), some of the battery modules may be charged unbalancedly. For example, a first battery module 101.i might not be fully charged to reach a second preset voltage value $V^0_2$ (e.g., a voltage at which the battery module is regarded as fully charged). Thus, the individual battery module 101.i may also be independently charged, as described below.

The battery module voltage feedback circuits 121.1, 121.2, 121.3, ..., 121.i, ..., 121.N may be configured to detect the voltage Vi at the two ends of each respectively battery module 101.i, and to send the detected voltage signals to the battery detecting system (EMS) 210. The battery detecting system (EMS) 210 may determine/judge whether each of the individual battery module has reached the preset second preset voltage value $V°_2$. If the battery detecting system (EMS) 210 determines that one or more certain battery modules 101.i have not reached the second preset voltage value $V°_2$, the processing chip 212 may send an switch-on signal to the corresponding relays 221.i through the input and output port 213, and the one or more second charging circuits 111.i may independently charge any of the battery modules 101.i which were not fully charged when the battery modules where charged in series using the first charging circuit 100, 100'. For independently charging one or more of the battery modules 101, a second charging voltage V2 may be used until the individual voltage Vi of the battery module reaches the second preset voltage value $V°_2$. The charging process of each individual battery module may be the same, until all the battery modules 101.1, 101.2, ..., 101.i, ..., 101.N reach the second preset voltage value ($V°_2$). The charging of the one or more of individual battery modules that were not fully charged in series by the first charging circuit, may be performed using the appropriate second charging circuits, and may be perform all at the same time or at different times (e.g., in sequence starting with the least charged battery module first), in processes controlled by the configuration of the processing chip 212.

As noted above, when charging batteries for electric vehicles and other electric devices, a battery may be charged only using a single charging circuit and the individual battery modules might not be separately charged. However, in such cases, the electric quantity of each battery module may be different from the other modules, and when the modules are connected in series for use, the internal resistance of the entire battery may be increased by these voltage differences in the modules, which may reduce the overall efficiency of the battery. Therefore, in certain embodiments, the battery detecting system (EMS) 210, the battery voltage feedback circuit 102, 102' and the battery module voltage feedback circuits 121.1, 121.2, 121.3, ..., 121.i, ..., 121.N may monitor the voltage states of the battery 110 as well as the voltages of the individual battery modules in real time. Each individual battery modules may be charged in at least two separate manners and with at least two different working voltages, for example, through the first charging circuit 100, 100', and through its respective second charging circuit 111, thereby ensuring that each of the battery modules may be fully charged in order to improve the overall working efficiency of the battery 110. Additionally, as noted above, one or more of the second charging circuits may be connected not just to a single battery module 101, but to a subset of multiple battery modules (e.g., 2 battery modules, 3 battery modules, etc.) in series. Therefore, in some cases, the each individual battery modules may be charged in more than two separate manners and with more than two different working voltages. For example, a first battery module may be charged using the first charging circuit, and separately charged using a second charging circuit connected only to the single battery module, and also may be charged using another second charging circuit (not shown in the figures) that is connected in series to a subset two, three, four, etc. battery modules including the first battery module.

In some embodiments, one or more of the second charging circuits may be connected not just to a single battery module, but to multiple battery modules in series. For instance, a second charging circuit 111 may be connected in series to two battery modules, or three battery modules, etc., or any other subset of the plurality of battery modules 101, thereby allowing the second charging circuit 111 to charge only that subset of the plurality of battery modules 101.

Figure 3:
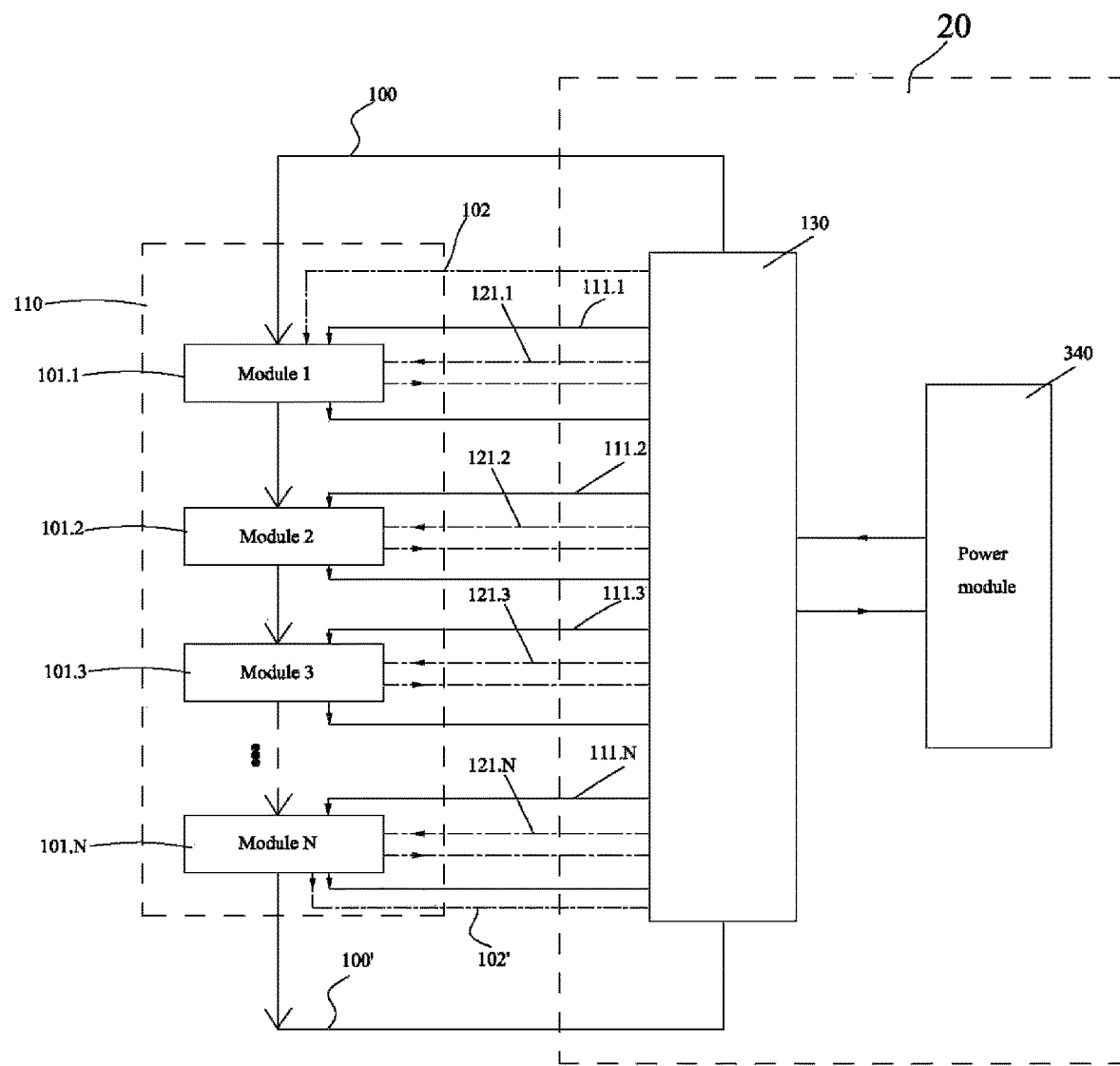
FIG. 3 is a schematic diagram of a circuit structure of a battery charging station in accordance with one or more embodiments the present invention.

Referring now to FIG. 3, a schematic diagram is shown of a circuit structure of a battery charging station in accordance with certain embodiments.

As discussed above in reference to FIG. 1, battery charging system 10 may be a circuit structure arranged within an electric device (e.g., a motor of an electric vehicle) and may be connected with the external charging pile/charging station 140 through the plug (omitted from the figure) to be supplied with electric power by the charging pile/charging station 140. In other embodiments, the battery charging system (e.g., including the first charging circuit, the second charging circuits, the battery voltage feedback circuit, the battery module voltage feedback circuits and the control circuit 130, and the like) may be arranged in the charging pile/charging station, to obtain the battery charging station 20 as shown in FIG. 3. In the battery charging station 20, the first charging circuit, the second charging circuits, the battery voltage feedback circuit and the battery module voltage feedback circuits may be connected with the battery and the battery modules through, for example, a multiple-pin plug. In such examples, the circuit structure of the battery charging station 20 may be similar to or the same as that of the battery charging system 10.

Figure 4:
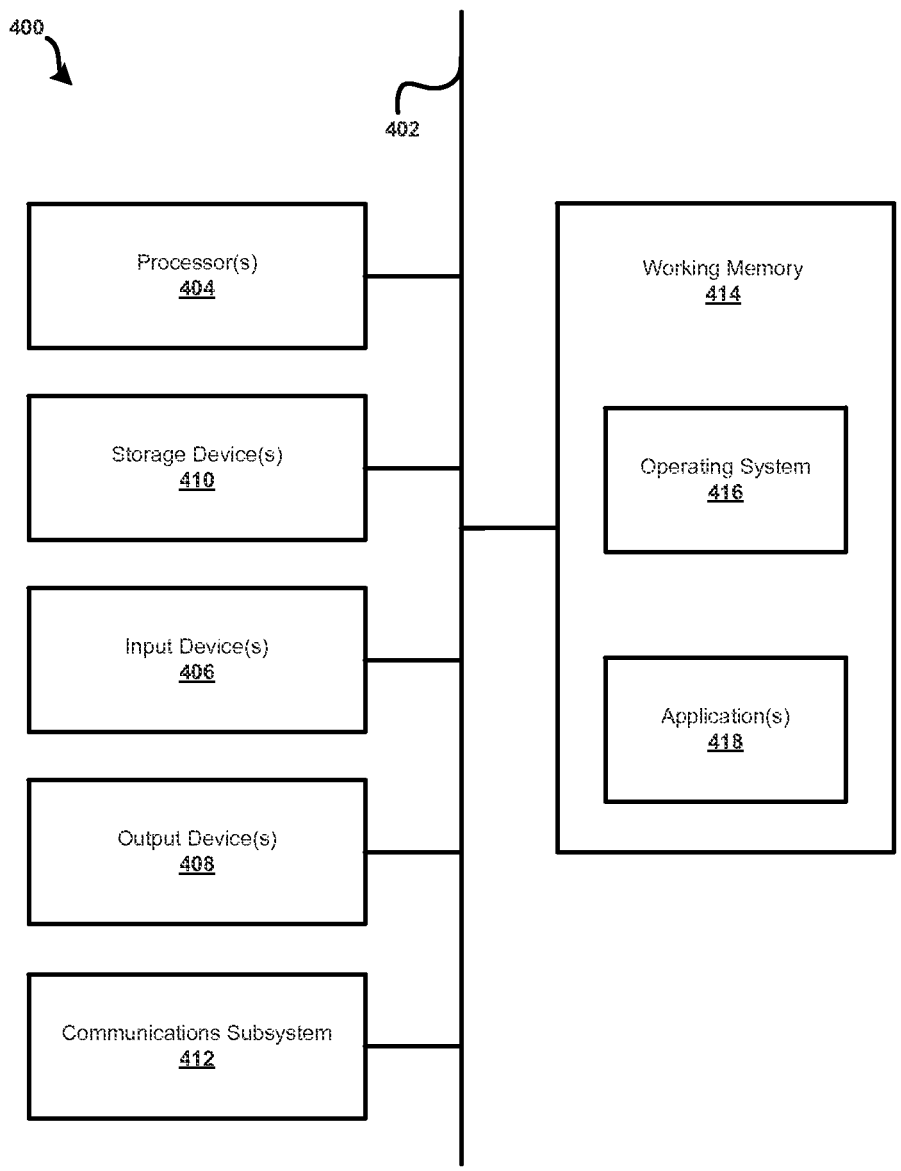
FIG. 4 shows an example block diagram for a computing system upon which various features of the present disclosure may be provided.

Referring now to FIG. 4, an example block diagram for a computer system or other computer device 400 which may be integrated into or operatively connected to the battery packs, battery modules, and battery charging stations described herein, as well as any other components described above. One or more computer systems or other computer devices 400 may control one or more aspects of the electric device and/or components described above. For example, one or more computer devices 400 may be used to implement various control circuits 130, battery detecting systems (EMSs) 210 and/or MCUs 212, and battery charging stations 140 described above. Accordingly, such components may include some or all of the features described below in reference to computer device 400. In some examples, the computer system or other computer devices 400 may include a tablet computer, personal data assistant, smartphone, gaming console, and/or a dedicated computer system for controlling the electric vehicle. Any particular one of the previously-described computing devices may be wholly or at least partially configured to exhibit features similar to the computer system 400.

The computer device 400 is shown comprising hardware elements that may be electrically coupled via a bus 402 (or may otherwise be in communication, as appropriate). The hardware elements may include a processing unit with one or more processors 404, including without limitation one or more general-purpose processors and/or one or more special-purpose processors (such as digital signal processing chips, graphics acceleration processors, and/or the like); one or more input devices 406, which may include without limitation a steering wheel, a climate control button or other user input receiving buttons, and/or the like; and one or more output devices 408, which may include without limitation a presentation device (e.g., a computer screen), a GPS, and/or the like.

The computer system 400 may further include (and/or be in communication with) one or more non-transitory storage devices 410, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 400 might also include a communications subsystem 412, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 412 may permit data to be exchanged with a network (such as the network described below, to name one example), other computer systems, and/or any other devices described herein. In many embodiments, the computer system 400 will further comprise a working memory 414, which may include a random access memory and/or a read-only memory device, as described above.

The computer device 400 also may comprise software elements, shown as being currently located within the working memory 414, including an operating system 416, device drivers, executable libraries, and/or other code, such as one or more application programs 418, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 410 described above. In some cases, the storage medium might be incorporated within a computer system, such as computer system 400. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 400) to perform methods in accordance with various embodiments of the disclosure. According to a set of embodiments, some or all of the procedures of such methods are performed by the computer system 400 in response to processor 404 executing one or more sequences of one or more instructions (which might be incorporated into the operating system 416 and/or other code, such as an application program 418) contained in the working memory 414. Such instructions may be read into the working memory 414 from another computer-readable medium, such as one or more of the storage device(s) 410. Merely by way of example, execution of the sequences of instructions contained in the working memory 414 may cause the processor(s) 404 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 400, various computer-readable media might be involved in providing instructions/code to processor(s) 404 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 410. Volatile media may include, without limitation, dynamic memory, such as the working memory 414.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 404 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 412 (and/or components thereof) generally will receive signals, and the bus 402 then might carry the signals (and/or the data, instructions, etc. carried by the signals) to the working memory 414, from which the processor(s) 404 retrieves and executes the instructions. The instructions received by the working memory 414 may optionally be stored on a non-transitory storage device 410 either before or after execution by the processor(s) 404.

It should further be understood that the components of computer device 400 can be distributed across a network. For example, some processing may be performed in one location using a first processor while other processing may be performed by another processor remote from the first processor. Other components of computer system 400 may be similarly distributed. As such, computer device 400 may be interpreted as a distributed computing system that performs processing in multiple locations. In some instances, computer system 400 may be interpreted as a single computing device, such as a distinct laptop, desktop computer, or the like, depending on the context.

EXAMPLES OF CERTAIN EMBODIMENTS

In a first example embodiment, a battery pack (150) of an electric vehicle may comprise a battery (110) and a battery charging system (10), wherein the battery (110) comprises a plurality of battery modules (101.1, 101.2, ..., 101.i, ..., 101.N), each battery module (101.i) is provided with one or more battery cells, and the plurality of battery modules (101.1, 101.2, ..., 101.i, ..., 101.N) are connected in series when providing electric power output, wherein the battery charging system (10) comprises: a first charging circuit (100, 100'), the first charging circuit (100, 100') connects the plurality of battery modules (101.1, 101.2, ..., 101.i, ..., 101.N) in series, and the first charging circuit (100, 100') is used for charging the plurality of battery modules (101.1, 101.2, ..., 101.i, ..., 101.N) in the battery (110) in series; second charging circuits (111.1, 111.2, ..., 111.i, ..., 111.N), the second charging circuits (111.1, 111.2, ..., 111.i, ..., 111.N) are connected to the plurality of battery modules (101.1, 101.2, ..., 101.i, ..., 101.N) respectively, and the second charging circuits (111.1, 111.2, ..., 111.i, ..., 111.N) are used for charging at least one battery module (101.i) in the plurality of battery modules (101.1, 101.2, ..., 101.i, ..., 101.N).

A second example embodiment may include the battery pack (150) of the first example embodiment, wherein the first charging circuit (100, 100') and the second charging circuits (111.1, 111.2, ..., 111.i, ..., 111.N) can work cooperatively with each other, or the first charging circuit (100, 100') and the second charging circuits (111.1, 111.2, ..., 111.i, ..., 111.N) can work independently.

A third example embodiment may include the battery pack (150) of the first example embodiment, wherein the first charging circuit (100, 100') apply voltage and current to the two ends of the plurality of battery modules (101.1, 101.2, ..., 101.i, ..., 101.N) connected in series for charging.

A fourth example embodiment may include the battery pack (150) of the second example embodiment, wherein the second charging circuits (111.1, 111.2, ..., 111.i, ..., 111.N) selectively charge one battery module (101.i) in the plurality of battery modules (101.1, 101.2, ..., 101.i, ..., 101.N) by applying voltage and current to the two ends thereof.

A fifth example embodiment may include the battery pack (150) of the first example embodiment, further comprising a control circuit (130) for selectively switching on or switching off the first charging circuit (100, 100') or the second charging circuits (111.1, 111.2, ..., 111.i, ..., 111.N).

A sixth example embodiment may include the battery pack (150) of the fifth example embodiment, wherein the second charging circuits (111.1, 111.2, ..., 111.i, ..., 111.N) can select a certain battery module (101.i) in the battery (110) and charge the two ends of the selected battery module (101.i).

A seventh example embodiment may include the battery pack (150) of the sixth example embodiment, wherein the battery charging system (10) further comprises a battery voltage feedback circuit (102, 102'), the battery voltage feedback circuit (102, 102') is connected with the control circuit (130) and used for sending a voltage signal reflecting the current voltage of the battery (110) to the control circuit (130); each one of the plurality of battery modules (101.1, 101.2, ..., 101.i, ..., 101.N) is connected to a battery module voltage feedback circuit (121.1, 121.2, ..., 121.i, ..., 121.N), and the battery module voltage feedback circuits (121.1, 121.2, ..., 121.i, ..., 121.N) are connected with the control circuit (130) and used for sending voltage signals reflecting the current voltages of the battery modules to the control circuit (130); the control circuit (130) starts or stops applying voltage and current for charging the two ends of the plurality of battery modules (101.1, 101.2, ..., 101.i, ..., 101.N) connected in series according to the current voltage of the battery (110); and the control circuit (130) selects a certain battery module (101.i) according to the current voltage of each battery module (101.i) to start or stop applying voltage and current for charging the selected battery module (101.i).

An eighth example embodiment may include the battery pack (150) of the seventh example embodiment, wherein the battery modules in the battery (110) are charged in series by using a first charging voltage (V1), and wherein the selected battery module in the battery (110) is charged independently by using a second charging voltage (V2).

A ninth example embodiment may include the battery pack (150) of the eighth example embodiment, the first charging voltage (V1) and the second charging voltage (V2) are different voltages.

A tenth example embodiment may include the battery pack (150) of the first example embodiment, wherein according to the voltage of the selected battery module (101.i), the second charging circuit (111.i) selects a proper voltage to charge the selected battery module (101.i) until the selected battery module (101.i) reaches a preset voltage.

A eleventh example embodiment may include the battery pack (150) of the seventh example embodiment, wherein the control circuit (130) further comprises: a battery detecting system (210) connected to the battery voltage feedback circuit (102, 102') and the battery module voltage feedback circuits (121.1, 121.2, ..., 121.i, ..., 121.N) for receiving the voltage signal sent by the battery voltage feedback circuit (102, 102') and the battery module voltage feedback circuits (121.1, 121.2, ..., 121.i, ..., 121.N) and controlling switch-on or switch-off of the first charging circuit (100, 100') and/or the second charging circuits (111.1, 111.2, ..., 111.i, ..., 111.N); a first circuit switch (220) connected to the first charging circuit (100, 100') and the battery detecting system (210) for switching on or switching off of the first charging circuit (100, 100') under the control of the battery detecting system (210); and second circuit switches (221.1, 221.2, 221.3, ... 221.i ... 221.N) connected to the second charging circuits (111.1, 111.2, ..., 111.i, ..., 111.N), respectively, and the battery detecting system (210) for switching on or switching off of the second charging circuits (111.1, 111.2, ..., 111.i, ..., 111.N) under the control of the battery detecting system (210).

In a twelfth example embodiment, a battery charging station (20) may be used for charging a battery (110), wherein the battery (110) comprises a plurality of battery modules (101.1, 101.2, ..., 101.i, ..., 101.N), each battery module is provided with one or more battery cells, and the plurality of battery modules (101.1, 101.2, ..., 101.i, ..., 101.N) are connected in series when providing electric power output, wherein the battery charging station (20) comprises: a first charging circuit (100, 100') for charging the battery (110) in series; second charging circuits (111.1, 111.2, ..., 111.i, ..., 111.N) for charging at least one battery module; the first charging circuit (100, 100') and the second charging circuits (111.1, 111.2, ..., 111.i, ..., 111.N) can work cooperatively with each other, or the first charging circuit (100, 100') and the second charging circuits (111.1, 111.2, ..., 111.i, ..., 111.N) work independently.

A thirteenth example embodiment may include the battery charging station (20) of the twelfth example embodiment, wherein the first charging circuits (100, 100') apply voltage and current for charging to the two ends of the plurality of battery modules (101.1, 101.2, ..., 101.i, ..., 101.N) connected in series.

A fourteenth example embodiment may include the battery charging station (20) of the twelfth example embodiment, further comprising: a control circuit (130) arranged in the battery charging station (20) and used for selectively switching on or switching off the first charging circuits (100, 100') or the second charging circuits (111.1, 111.2, ..., 111.*i*, ..., 111.N).

In a fifteenth example embodiment, a method may be performed for charging a battery (110), wherein the battery (110) comprises a plurality of battery modules (101.1, 101.2, ..., 101.*i*, ..., 101.N), each battery module is provided with one or more battery cells, and the plurality of battery modules (101.1, 101.2, ..., 101.*i*, ..., 101.N) are connected in series when providing electric power output, wherein the method comprises the following steps: 1) measuring the voltage (V) of the battery (110), judging whether the battery needs to be charged, if so, then: 2) using a first charging circuit (100, 100') to charge the battery modules in the battery (110) in series; 3) measuring whether the voltage (V) of the battery modules connected in series reaches a first preset voltage value ($V^0_1$); 4) if the voltage (V) of the battery modules connected in series reaches the first preset voltage value ($V^0_1$), measuring whether the voltage (V') of each battery module in the battery (110) reaches a second preset voltage value ($V^0_2$); 5) selecting one or more battery modules (101.*i*) not reaching the second preset voltage value ($V^0_2$); and 6) using the corresponding second charging circuits (111.1, 111.2, ..., 111.*i*, ..., 111.N) to charge the selected one or more battery modules (101.*i*) until the voltages (V') thereof reach the second preset voltage value ($V^0_2$).

Although the present invention has been described with reference to the specific embodiments shown in the drawings, it should be understood that the charging system and the charging method provided by the present invention can have a variety of variations without departing from the spirit, scope and background of the present invention. Those of ordinary skill in the art should be still aware that, parameters in the embodiments disclosed by the present invention can be changed in different manners, and these changes shall fall within the spirit and scope of the present invention and the claims.

What is claimed is:

1. A battery pack for an electric vehicle, comprising:
   a battery comprising a plurality of series connected battery modules; and
   a battery charging system, comprising:
   a first charging circuit connecting the plurality of battery modules in series, the first charging circuit configured to charge the plurality of battery modules in series, the plurality of battery modules including a first battery module;
   a plurality of second charging circuits, wherein each of the plurality of second charging circuits is connected to a corresponding one of the plurality of battery modules independently from the first charging circuit, and wherein each of the plurality of second charging circuits is configured to charge the corresponding battery module, the plurality of second charging circuits including a second charging circuit configured to charge the first battery module and a second battery module; and
   a control circuit configured to:
   switch on the first charge circuit to charge the battery modules in series;
   measure whether the voltage of the battery modules connected in series reaches a first preset voltage value;
   if the voltage of the battery modules connected in series reaches the first preset voltage value, measure whether the voltage of each battery module in the battery reaches a second preset voltage value;
   select one or more battery modules not reaching the second preset voltage value;
   charge the selected one or more battery modules using corresponding second charging circuits connected to the first and second battery modules until the voltages thereof reach the second preset voltage value.

2. The battery pack of claim 1, wherein the first charging circuit and the plurality of second charging circuits are configured to work independently to charge the plurality of battery modules.

3. The battery pack of claim 1, wherein the first charging circuit is configured to apply voltage and current to two ends of the series connected plurality of battery modules.

4. The battery pack of claim 1, wherein a first of the plurality of second charging circuits is configured to charge a first battery module of the plurality of battery modules by applying voltage and current to two ends of the first battery module.

5. The battery pack of claim 1, wherein each of the plurality of second charging circuits is configured to charge the two ends of its corresponding battery module.

6. The battery pack of claim 5, further comprising:
   a battery voltage feedback circuit connected to the battery and to the control circuit, the battery voltage feedback circuit configured to send a voltage signal reflecting a current voltage of the battery to the control circuit; and
   a plurality of battery module voltage feedback circuits, each battery module voltage feedback circuit connected to the control circuit and one of the plurality of battery modules, wherein each of the battery module voltage feedback circuits is configured to send voltage signals reflecting a current voltage of its associated battery module to the control circuit,
   wherein the control circuit is configured to start or stop applying voltage and current for charging the two ends of the series connected plurality of battery modules, based on the current voltage of the battery, and
   wherein the control circuit is further configured to select a first battery module of the plurality of battery modules and to start or stop applying voltage and current for charging the first selected battery module, based on the current voltage of each of the plurality of battery modules.

7. The battery pack of claim 1, wherein:
   the plurality of battery modules are charged in series by the first charging circuit, using a first charging voltage; and
   the first selected battery module is charged independently by the second charging circuit corresponding to the first selected battery module, using a second charging voltage.

8. The battery pack of claim 7, wherein the first charging voltage and the second charging voltage are different voltages.

9. The battery pack of claim 6, wherein the control circuit further comprises:
   a battery detecting system connected to the battery voltage feedback circuit and to each of the plurality of battery module voltage feedback circuits, the battery detecting system configured to receive the voltage signals sent by the battery voltage feedback circuit and the battery module voltage feedback circuits, and to control the switching-on or switching-off of the first charging circuit and the plurality of second charging circuits;

a first circuit switch connected to the first charging circuit and the battery detecting system, the first circuit switch configured to switch on or switch off the first charging circuit under the control of the battery detecting system; and a plurality of second circuit switches, each second circuit switch connected to the corresponding second charging circuit and to the battery detecting system, the second circuit switches configured to switch on or switch off the second charging circuits under the control of the battery detecting system.

10. A battery charging station for charging a battery comprising a series connected plurality of battery modules, the battery charging station comprising:

a first charging circuit configured to charge the series connected plurality of battery modules in series, the plurality of battery modules including a first battery module and a second battery module;

a plurality of second charging circuits, each second charging circuit configured to charge a corresponding one of the plurality of battery modules, independently from the first charging circuit, the plurality of second charging circuits including a second charging circuit configured to charge the first battery module and the second battery module; and a control circuit configured to switch on the first charge circuit to charge the battery modules in series;

measure whether the voltage of the battery modules connected in series reaches a first preset voltage value;

if the voltage of the battery modules connected in series reaches the first preset voltage value, measure whether the voltage of each battery module in the battery reaches a second preset voltage value;

select one or more battery modules not reaching the second preset voltage value; and charge the selected one or more battery modules using corresponding second charging circuits connected to the first and second battery modules until the voltages thereof reach the second preset voltage value.

11. The battery charging station of claim 10, wherein the first charging circuit and the plurality of second charging circuits are configured to work independently when charging the plurality of battery modules.

12. The battery charging station of claim 10, wherein the first charging circuit is configured to charge the plurality of battery modules in series by applying voltage and current for to two ends of the series connected plurality of battery modules.

13. The battery charging station of claim 10, wherein:

the plurality of battery modules are charged in series by the first charging circuit, using a first charging voltage; and the first selected battery module is charged independently by the second charging circuit corresponding to the first selected battery module, using a second charging voltage.

14. The battery charging station of claim 13, wherein the first charging voltage and the second charging voltage are different voltages.

* * * * *